United States Patent [19]

Farr et al.

[11] 4,070,090

[45] Jan. 24, 1978

[54] OPTICAL INSTRUMENT EMPLOYING A TRUNCATED PRISM HAVING ITS DISTAL END DISPOSED PROXIMATE A PLANAR END OF AN OPAQUE TUBULAR HOUSING

[75] Inventors: Robert C. Farr; Alfred Hametner, both of San Jose, Calif.

[73] Assignee: Hametner-Farr Company, Inc., Santa Clara, Calif.

[21] Appl. No.: 700,490

[22] Filed: June 28, 1976

[51] Int. Cl.² .................. G02B 13/06; G01N 21/00
[52] U.S. Cl. .................................. 350/21; 350/96 T; 350/286; 356/241
[58] Field of Search ................... 350/235–237, 350/21–26, 96 R, 96 T, 16, 175 LD, 198, 286–287; 356/153, 241; 128/4

[56] References Cited

U.S. PATENT DOCUMENTS

| | | | |
|---|---|---|---|
| 1,804,105 | 5/1931 | Martens | 350/237 |
| 2,036,622 | 4/1936 | Emmerich | 350/286 |
| 2,932,294 | 4/1960 | Fourestier et al. | 350/96 R |
| 3,357,433 | 12/1967 | Fourestier et al. | 128/4 |
| 3,439,157 | 4/1969 | Myles | 350/96 R |
| 3,467,840 | 9/1969 | Weiner | 350/96 R |
| 3,922,097 | 11/1975 | Machet | 350/24 |

OTHER PUBLICATIONS

McGroddy, J. C., "Thermal Conversion of Solar Energy," IBM Tech. Disc. Bull., vol. 18, 9-1975, pp. 1214–1215.
Titan, "Titan Zoom-A-Bore," advertisement from Titan Tool Supply Co., 68 Comet Ave., P.O. Box 1682, Buffalo, N.Y. 14216.

*Primary Examiner*—Paul A. Sacher
*Assistant Examiner*—Wm. H. Punter

*Attorney, Agent, or Firm*—Boone, Schatzel, Hamrick & Knudsen

[57] ABSTRACT

An optical instrument for use in examining the internal wall of an aperture in a work material comprising a generally tubular housing formed from a material that is opaque to light and having a central axis and first and second ends, the first end having an annular surface that lies in a plane substantially normal to the central axis, a light directing member formed from a transparent material and having a shape in the form of an elongated frustum of a right rectangular pyramid, the member having a longitudinal axis that is coincident with the central axis, a third end having a first rectangular dimension, a fourth end having a second rectangular dimension that is larger than the first dimension, and four faces extending between the third and fourth ends, each face being capable of internally reflecting light passing through the member and incident on the face, the member being mounted within the housing intermediate the first and second ends such that the third end terminates within the housing proximate the first end, and a pair of lenses mounted within the housing between the fourth end and the second end for focusing and magnifying an image formed by the light passing through the member, whereby when the first end is placed against the work material with the axes in substantial alignment with the center of the aperture, and the second end is placed in front of the eye of a viewer, ambient light reflected off the internal wall passes through the third end and is reflected internally by the faces so as to provide images representative of corresponding portions of the internal wall, and whereby the lenses serve to focus and magnify the images so as to permit the viewer to observe the physical appearance of the internal wall.

4 Claims, 5 Drawing Figures

U.S. Patent  Jan. 24, 1978  4,070,090
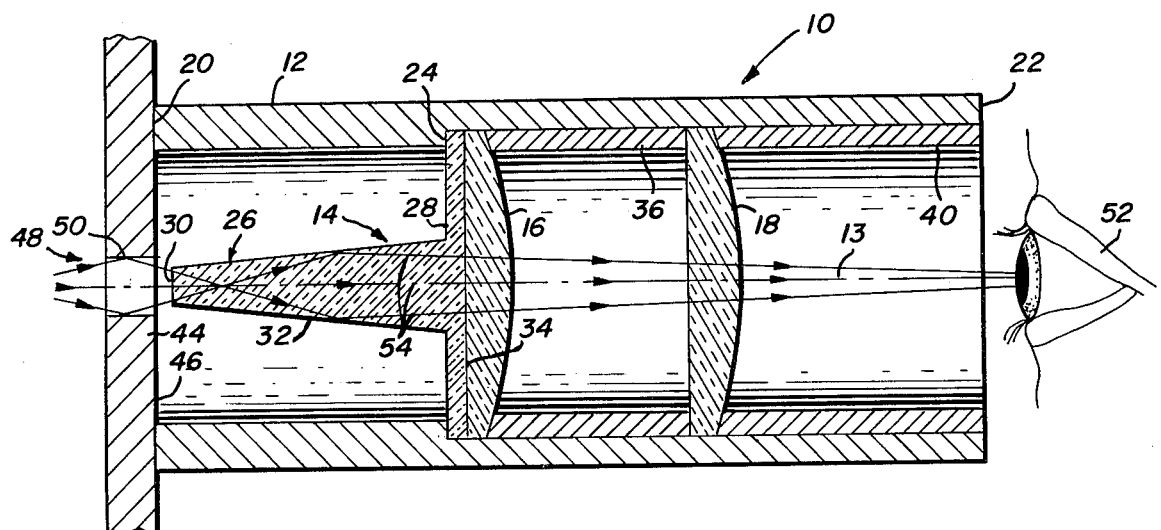
Fig_1
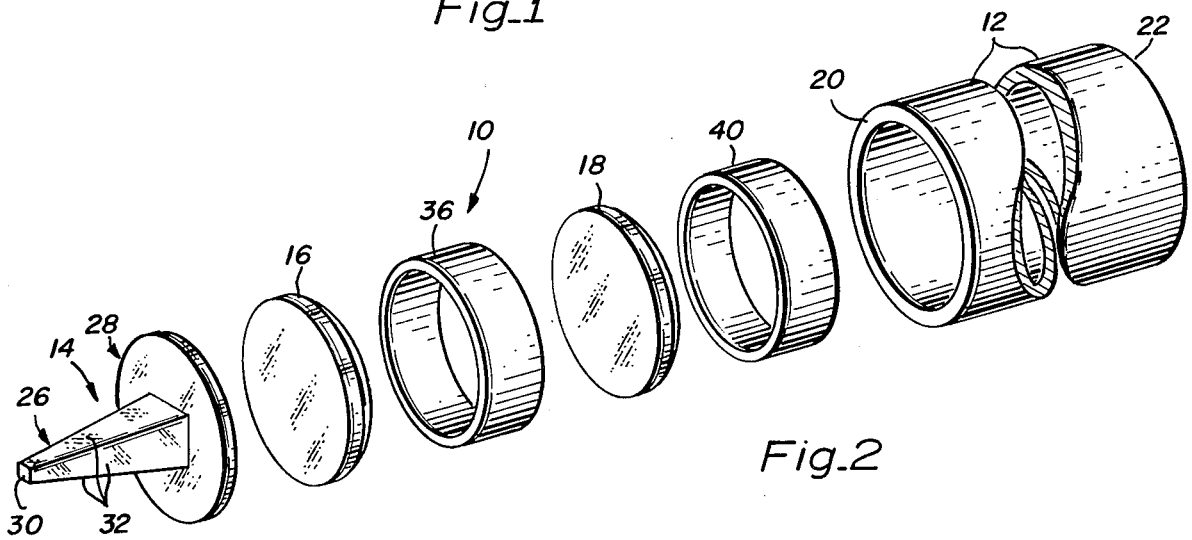
Fig_2
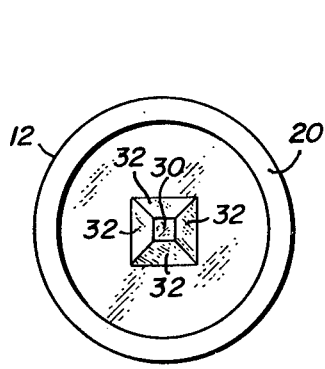
Fig_3
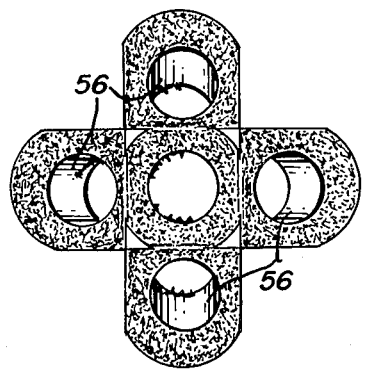
Fig_4
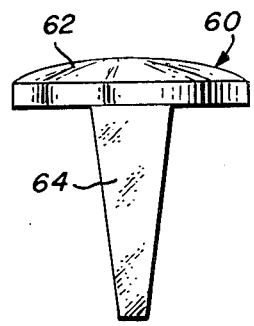
Fig_5

OPTICAL INSTRUMENT EMPLOYING A TRUNCATED PRISM HAVING ITS DISTAL END DISPOSED PROXIMATE A PLANAR END OF AN OPAQUE TUBULAR HOUSING

BACKGROUND OF THE INVENTION

1. Field of the Invention

The present invention relates generally to optical instruments and, more particularly, to optical instruments employing a truncated prism having its distal surface disposed proximate a planar end of an opaque tubular housing for use in permitting a viewer to observe the physical appearance of an internal wall of an aperture in a printed circuit board.

2. Description of the Prior Art

Heretofore, a device for scanning the internal wall of a hole in a printed circuit board or the like in order to determine if there are blemishes has not been available. Such blemishes, for example, can be caused as a result of a void in plating, an improper solder flow or a drilling operation that develops rough spots and burrs and typically have been found to lead to the production of printed circuit boards that have poor electrical connections. As a consequence, inspectors of printed circuit boards have been required to utilize a relatively expensive fisheye-type microscope to detect such blemishes. A disadvantage of such a detection technique is that it is a laborious, time consuming procedure which requires an experienced operator. Furthermore, since only a small portion of the wall is capable of being viewed with a single set up of the microscope, several set-ups are required to observe substantially the entire internal wall of such hole.

An example of a prior art optical instrument for examining an object located in direct or immediate contact with its distal face is found in U.S. Pat. No. 3,357,433, "Endoscope for Illumination and Observation of Contacting Distal Regions," by Max Foursetier, G. F. Guiot, Jacques F. Rougerie, H. N. Vulmiere, and Jacques C. Vulmiere. Although the patent reveals a contact endoscope employing a cylindrically-shaped rod terminating in a member having the shape of a prism, an ogive, etc., it does not reveal an optical instrument employing a truncated prism having its distal end disposed proximate a planar end of an opaque tubular housing which is particularly formed to permit the viewer to observe the physical appearance of the internal wall of an aperture in a printed circuit board.

SUMMARY OF THE PRESENT INVENTION

It is therefore a primary object of the present invention to provide a hand-held optical instrument for use by an inspector of printed circuit boards which permits him to observe the physical appearance of the entire internal wall of an aperture in a printed circuit board with a single viewing and which is lightweight, does not consume power, provides an automatic focusing when brought into contact with the work surface of the printed circuit board, and is of low cost.

Still another object of the present invention is to accomplish the previously stated object by providing a truncated elongated prism mounted within an opaque housing with its distal end being parallel to a planar end of the housing and being disposed proximate thereto such that ambient light passing through the hole is reflected off the internal wall, passes through the distal end and is reflected internally by the faces of the prism so as to provide images representative of corresponding portions of the internal wall for visual observation by the viewer.

Yet another object of the present invention is to provide an optical instrument which is simple in structure and in operation and enables the internal wall of an aperture in a work surface to be observed in a reliable and convenient manner and which may be used by jewelers, camera repairmen, machinists, hobbyists or others involved in drilling precise and relatively smooth holes.

Briefly, the preferred embodiment includes an opaque, generally tubular housing having a central axis and first and second ends, the first end having an annular surface that lies in a plane substantially normal to the central axis, a light directing member formed from a transparent material and having a shape in the form of an elongated frustum of a right rectangular pyramid, the member having a longitudinal axis that is coincident with the central axis, a third end having a first rectangular dimension, a fourth end having a second rectangular dimension that is larger than the first dimension, and four faces extending between the third and fourth ends, each face being capable of internally reflecting light passing through the member and incident on the face, the member being mounted within the housing intermediate the first and second ends such that the third end terminates within the housing proximate the first end, and a pair of lenses mounted within the housing between the fourth end and the second end for focusing and magnifying an image formed by the light passing through the member, whereby when the first end is placed against a work material with the axes in substantial alignment with the center of an aperture in the material, and the second end is placed in front of the eye of a viewer, ambient light reflected off the internal wall of the aperture passes through the third end and is reflected internally by the faces so as to provide images representative of corresponding portions of the internal wall, and whereby the lenses serve to focus and magnify the images so as to permit the viewer to observe the physical appearance of the internal wall.

Among the advantages of the present invention are that it is simple in structure and in operation, lightweight, compact, does not consume power, and allows a viewer to observe the physical appearance of the internal wall of an aperture in a working surface with a single positioning scan.

These and other objects of the present invention will no doubt become apparent to those of ordinary skill in the art after having read the following detailed description of the preferred embodiments which are illustrated in the several figures of the drawing.

IN THE DRAWING

FIG. 1 is an axial cross-section view of an optical instrument in accordance with the present invention and a schematic illustration of its operation;

FIG. 2 is an exploded perspective view further illustrating the optical instrument shown in FIG. 1;

FIG. 3 is a bottom plan view of the optical instrument illustrated in FIG. 1;

FIG. 4 is a diagram illustrating the images of an internal wall of an aperture in a work material provided by the optical instrument; and FIG. 5 is an elevation view of the reflecting member of an alternative embodiment of the present invention.

DETAILED DESCRIPTION OF THE PREFERRED EMBODIMENT

Referring now to FIGS. 1-3 of the drawing, an optical instrument 10 in accordance with the present invention is illustrated in an axial cross section view, in an exploded view, and in a bottom plan view. The instrument 10 comprises a housing 12, a light directing member 14 and lenses 16 and 18.

The housing 12 is formed from a material that is opaque to light and has a generally tubular shape with annular ends 20 and 22 that lies in parallel planes that are substantially normal to its axis 13. Its inner surface intermediate the ends 20 and 22 defines a bore and includes a shoulder 24 to facilitate mounting the light directing member as will be subsequently described. The opacity of the housing precludes light that does not enter through the ends from the bore region. In the preferred embodiment, the housing is formed from a black delrin material, has an axial dimension of 2.00 inches, inner bore diameters of 0.850 inches and 0.990 inches, and an outer diameter of 1.20 inches.

The light directing member or reflecting member 14 is formed from a material that is capable of reflecting light and includes a reflecting portion 26 and a mounting portion 28. The reflecting portion 26 has an elongated truncated prism-like shape that is in the form of a frustum of a right square pyramid and comprises a longitudinal axis that is coincident with the axis 13, square distal end 30 and four faces 32 that depend from a corresponding side of the periphery of the distal end and that form an angle with the axis 13. The reflecting portion 26 serves to reflect light passing internally through the member and incident on each face through the lenses 16 and 18. In the preferred embodiment, the axial dimension of the face is 0.750 inches, the dimension of each side of the distal end is 0.080 inches and the faces are inclined at an angle of substantially 8° relative to the axis.

It has been found that when the faces are inclined at an angle of less than 7.5° or more than about 9°, the entire depth of a hole in a printed circuit board cannot be observed with a single observation. For example, in angles greater than 9°, the board must be turned over in order to observe the entire inner periphery of the hole.

The mounting portion 28 has a shape that resembles a thin cylindrical disk and serves to snugly mount the member within the housing against the shoulder 24. In the preferred embodiment the mounting portion has an outer diameter of 0.987 inches and an axial dimension of 0.080 inches and is integrally formed with the reflecting portion from plexiglass material.

The lens 16 is a plano-convex converging lens with its planar surface 34 abutting the outer surface of the mounting portion. The lens 16 serves to magnify and invert an image incident on its planar surface.

A spacer 36 having a tubular shape is mounted within the housing 12 in an abutting relationship with the convex surface of the lens 16 and serves to maintain the lens against the shoulder 24 while providing a predetermined separation between the lenses 16 and 18. In the preferred embodiment, the spacer is formed from a black delrin material with an inner diameter of 0.850 inches and an outer diameter of 0.985 inches and also serves to prevent light from entering the bore region through the wall of the housing.

The lens 18 is a plano-convex converging lens that is similar in construction to the lens 16. Its planar surface is disposed against the spacer 36 and its convex surface is disposed towards the end 22. The lens 18 serves to magnify and invert the image transmitted through the lens 16 so as to provide a magnified image that is not inverted relative to that incident on the lens 16. In the preferred embodiment, the lenses 16 and 18 provide a ten-times magnification of the image, the convex surfaces of the lenses 16 and 18 have a radius of 2.5 inches and such lenses are manufactured by the U.S. Precision Lens Corporation of Cincinnati, Ohio.

A tubular retaining ring 40 is disposed between the lens 18 and the end 22 with its outer surface bonded with an appropriate adhesive to the inner surface of the housing 12. The retaining ring 40 serves to secure the components within the housing. In the preferred embodiment the retaining ring is formed from a black delrin material, has an inner diameter of 0.850 inches, an outer diameter of 0.993 inches and an axial dimension of 0.5 inches.

The optical instrument 10 is adapted for use with an object 44, such as a printed circuit board or the like, having a generally planar work surface 46 and having an aperture 48 with an internal wall 50 that has a diameter greater than or less than the dimension of a side of the distal end 30. Typically, the internal wall 50 is formed by drilling and includes blemishes such as rough spots, burrs, etc., that may tend to adversely affect the electrical characteristics of the finished printed circuit board.

It should be noted that most printed circuit boards have a thickness of 1/16 inches, i.e., 0.062 inches, although other boards can have thicknesses of 0.031 inches, 0.093 inches or 0.125 inches.

In operation, as shown schematically in FIG. 1, the viewer holds the instrument 10 with the annular end 20 against the corresponding planar work surface 46 such that the reflecting member 14 is in axial alignment with the aperture 48 and with the end 22 in front of his eye, indicated by the numeral 52. Ambient light, represented by the numeral 54, passing through the aperture 48 is directed through the instrument to the viewer's eye. However, the opacity of the housing precludes light from entering the bore region through the wall of the housing. The light 54 is reflected off the internal wall 50 in a direction so that it passes through the distal end 30 of the reflecting member 14. A portion of the light passing internally within the member 14 is incident on a face 32 and is reflected off such face in such a manner as to provide an image representative of a corresponding portion of the internal wall 50. The 8° inclination of the faces provides a tunnel-type effect which permits the image of the entire depth of the internal wall 50 to be observed. Similarly, a portion of the light 54 is reflected off the internal wall 50 and passes through the member 14 without being reflected off the face 32. Such light provides an image representative of the entire periphery of the internal wall 50. The lenses 16 and 18 serve to magnify the images with a sufficient power so as to permit the viewer to observe the appearance of the internal wall with a single placement of the instrument 10. Because the radii of the convex surfaces of the lenses 16 and 18 are relatively large, the images appear to be in focus to the viewer.

With reference to FIG. 4, the images of the internal wall 50, as they appear to the viewer, are shown. As illustrated, the image provided by the light that is not reflected off the faces appears in the center of the figure. Furthermore, each of the images produced by reflections off the internal wall and a corresponding face is illustrated by the four peripheral images adjacent the central image. It has been found that the five images represent substantially the entire periphery of the internal wall. Hence, the viewer is able to clearly identify any blemish, such as the ridges indicated by the numeral 56, on the internal wall of the aperture.

Since the five images are grouped relatively close together, only minimal eye scan is required for the viewer to identify all blemishes with a single positioning of the instrument.

In an alternative embodiment illustrated in FIG. 5, a reflecting member 60 is shown. The fundamental difference between the reflecting member 60 in this figure and that illustrated in FIGS. 1–3 is that it includes a converging lens portion 62 that is integrally formed with a reflecting portion 64. In the preferred embodiment the reflecting member 60 is fabricated from glass. Such member operates in an identical manner to the reflecting member and lens in the embodiment previously described.

From the above, it will be seen that there has been described an instrument employing a truncated prism and having its distal end disposed proximate a planar end of an opaque tubular housing that enables an inspector to simply observe all blemishes on an internal wall of an aperture in a printed circuit board that might tend to adversely affect the electrical characteristics of circuits carried by the board.

While the invention has been particularly shown and described with reference to certain preferred embodiment, it will be understood by those skilled in the art that various alterations and modifications in form and detail may be made therein. Accordingly, it is intended that the following claims cover all such alterations and modifications as fall within the true spirit and scope of the invention.

What is claimed is:

1. An optical instrument for use in examining the internal wall of an aperture in a work material comprising:
    a generally tubular housing formed from a material that is opaque to light and having a central axis and first and second ends, said first end having an annular surface that lies in a plane substantially normal to said central axis;
    a first lens mounted within said housing intermediate said first and second ends, said first lens including opposed first planar and convex surfaces and being capable of focusing and magnifying an image incident on said first planar surface;
    a light directing member formed from a transparent material and having a longitudinal axis that is coincident with said central axis, said member including a reflectig portion having a shape in the form of an elongated frustum of a right rectangular pyramid and a mounting portion that is disposed in an abutting relationship relative to said first planar surface, said reflecting portion including a third end having a first rectangular dimension, a fourth end having a second rectangular dimension that is larger than said first dimension, and four faces extending between said third and fourth ends, each said face being capable of internally reflecting light passing through said member and incident on said face, said mounting portion being mounted within said housing intermediate said first and second ends such that said third end terminates within said housing proximate said first end;
    a second lens mounted within said housing intermediate said second end and said first lens, said second lens including a second planar surface disposed in a facing relationship relative to said first convex surface and an opposed second convex surface and being capable of focusing and magnifying an image passing through said first lens;
    a generally tubular spacer disposed between said first convex surface and said second planar surface for maintaining a predetermined spacing between said lenses; and
    a generally tubular retaining ring disposed between said second convex surface and said second end, and serving to maintain said second lens within said housing, whereby when said first end is placed against said work material with said axes in substantial alignment with the center of said aperture, and said second end is placed in front of the eye of a viewer, ambient light reflected off said internal wall passes through said third end and is reflected internally by said faces so as to provide images representative of corresponding portions of said internal wall, and whereby said first and second lenses serve to focus and magnify said images so as to permit the viewer to observe the physical appearance of said internal wall.

2. An optical instrument as recited in claim 1 wherein each of the four faces is planar and is inclined at an angle of about 8° relative to an imaginary plane normal to said third end and passing through said central axis.

3. An optical instrument as recited in claim 2 wherein said third end has a generally square shape.

4. An optical instrument as recited in claim 1 wherein said first lens and said light directing member are integrally formed.

* * * * *